US010131581B2

(12) United States Patent
Bouteiller et al.

(10) Patent No.: US 10,131,581 B2
(45) Date of Patent: Nov. 20, 2018

(54) COMPOSITION FOR JOINTS

(71) Applicant: SAINT-GOBAIN PLACO, Suresnes (FR)

(72) Inventors: Bernard Bouteiller, Molleges (FR); Marc Roubin, Courthezon (FR)

(73) Assignee: SAINT-GOBAIN PLACO, Suresnes (FR)

( * ) Notice: Subject to any disclaimer, the term of this patent is extended or adjusted under 35 U.S.C. 154(b) by 0 days.

(21) Appl. No.: 15/321,021

(22) PCT Filed: Jun. 25, 2015

(86) PCT No.: PCT/FR2015/051716
§ 371 (c)(1),
(2) Date: Dec. 21, 2016

(87) PCT Pub. No.: WO2015/197984
PCT Pub. Date: Dec. 30, 2015

(65) Prior Publication Data
US 2017/0197882 A1    Jul. 13, 2017

(30) Foreign Application Priority Data
Jun. 26, 2014  (FR) ..................... 14 56005

(51) Int. Cl.
| *C04B 28/06* | (2006.01) |
| *C04B 26/02* | (2006.01) |
| *C04B 28/14* | (2006.01) |
| *C04B 14/30* | (2006.01) |
| C04B 111/00 | (2006.01) |
| C04B 111/28 | (2006.01) |
| C04B 111/34 | (2006.01) |

(52) U.S. Cl.
CPC ............ *C04B 28/06* (2013.01); *C04B 14/303* (2013.01); *C04B 26/02* (2013.01); *C04B 28/145* (2013.01); *C04B 2111/00637* (2013.01); *C04B 2111/00681* (2013.01); *C04B 2111/28* (2013.01); *C04B 2111/34* (2013.01)

(58) Field of Classification Search
CPC ....... C04B 28/06; C04B 26/02; C04B 28/145; C04B 14/303; C04B 2111/00681; C04B 2111/34; C04B 2111/28; C04B 2111/00637
See application file for complete search history.

(56) References Cited

U.S. PATENT DOCUMENTS

| 2005/0139126 A1 | 6/2005 | Khan et al. |
| 2008/0245273 A1 * | 10/2008 | Vyorkka ............... C04B 26/02 106/665 |

FOREIGN PATENT DOCUMENTS

| CN | 103012948 |   | 4/2013 |
| CN | 103012948 A | * | 4/2013 |
| CN | 103254493 A | * | 8/2013 |
| CN | 103408236 A | * | 11/2013 |
| CN | 101659824 A | * | 3/2014 |
| CN | 103617836 A |   | 3/2014 |
| CN | 103641502 A | * | 3/2014 |
| CN | 103849045 A | * | 6/2014 |
| CN | 103881185 A |   | 6/2014 |
| FR | 2 640 658 A1 |   | 6/1990 |

OTHER PUBLICATIONS

Aluminum Hydroxide MSDS, pp. 1-9, (Oct. 2010).*
International Search Report dated Sep. 24, 2015, in PCT/FR2015/051716 filed Jun. 25, 2015.

* cited by examiner

*Primary Examiner* — Anthony J Green
(74) *Attorney, Agent, or Firm* — Oblon, McClelland, Maier & Neustadt, L.L.P.

(57) ABSTRACT

A composition based on calcium carbonate includes nanometric boehmite and/or nanometric aluminum trihydroxide. A coating can be obtained from this composition. This composition makes it possible to obtain products having better high-temperature dimensional stability.

21 Claims, No Drawings

COMPOSITION FOR JOINTS

The present invention relates to a composition for joints that can be used for forming building products, in particular that can be used for making joints (or grouting) in plasterboard or plaster tiles notably intended for forming and/or covering partitions or ceilings of buildings.

The joints, as well as the plasterboard, must meet various requirements relating to their use for construction, and in particular must comply with the regulatory requirements with respect to fire resistance.

In order to improve this resistance, it is notably known, for plasterboard, to add various additives to the plaster composition, making it possible, if necessary, to limit or delay dimensional variation (or shrinkage) of the board under the effect of heat, such as vermiculite, perlite, crystalline silica, glass fibres or else additives in the form of clay materials, compounds of boron or of silicon or of aluminium, etc. The use of certain additives may, however, prove difficult, or these additives may lead to a considerable increase in cost, and moreover the improvement in fire resistance may be slight.

There are, moreover, applications that require greater fire resistance. The overall resistance of partitions or ceilings based on plasterboard can notably be improved using a joint that has improved fire resistance.

The present invention has therefore tried to develop an improved joint based on calcium carbonate displaying particularly satisfactory high-temperature dimensional stability.

This aim is achieved thanks to the composition based on calcium carbonate according to the invention, characterized in that it further comprises nanometric boehmite and/or nanometric aluminium trihydroxide. Such an additive notably makes it possible to improve the dimensional stability and/or limit the shrinkage at high temperature. Advantageously, said composition comprises (initially), in percentages by weight relative to the total dry mix:
- from 50 to 99%, in particular from 55 to 98%, of calcium carbonate,
- from 0.1 to 10 wt %, preferably from 1 to 10 wt %, in particular between 3 and 8 wt %, of nanometric boehmite and/or nanometric aluminium trihydroxide,
- at least one additive, in particular an organic additive, notably at least one additive allowing chemical setting of said composition after forming or binder.

The additive or additives allowing chemical setting of the composition (or binding of the particles to one another) after forming, or binder(s), are most often organic. They are normally present in the composition (dry extract) at a level from 0.5 to 10 wt % of said composition, in particular from 1 to 10 wt % of said composition.

Unless stated otherwise in the present invention, the percentages by weight are given relative to the total dry mix (or dry extract, the total dry mix notably comprising calcium carbonate, boehmite and/or aluminium trihydroxide, i.e. the mix devoid of (or after extraction of) any liquid medium serving for dispersion of the components, in particular devoid of water. The composition is formed from the components indicated, (generally mixed) in the proportions given relative to the dry mix.

The composition may also comprise one or more additives and/or additional components, it also being possible for this or these additives to be one or more mineral additives, usually employed in this area and/or facilitating usage of the composition and/or improving its resistance, notably to fire, and/or improving other properties.

In particular, the composition may also comprise from 0 to 30 wt %, preferably between 0 and 25 wt %, for example between 0 and 20 wt %, of at least one or more mineral additives.

The organic and mineral additives are for example described now, it being understood that the list given below is neither restrictive, nor exhaustive with regard to the scope of the present invention and that a composition according to the invention may comprise one or more of the additives listed hereinafter.

An advantageous composition according to the invention may notably comprise hydrated calcium sulphate (semihydrate or dihydrate) or else anhydrous, in an amount, however, below 30 wt % of said composition (dry extract), and preferably in an amount below 15 wt % of said composition, or even below 10 wt % or even 5 wt %.

An advantageous composition according to the invention may notably comprise dolomite, in an amount, however, below 30 wt % of said composition (dry extract), and preferably in an amount below 15 wt % of said composition, or even below 10 wt % or even 5 wt %.

An advantageous composition according to the invention may also comprise talc or particles of mica, included in a small proportion, generally less than or equal to 5%, notably less than or equal to 2% by weight of the composition.

A clay, notably in the form of bentonite, may also be incorporated in a composition according to the invention to thicken it. The amount of said clay is generally below 5%, or even below 2%, by weight of the composition.

A cellulose ether, and/or another thickening agent (for instance a polyacrylamide, etc.), may alternately or additionally also be used for increasing the viscosity of a composition according to the invention in an amount most often below 1%, or even below 0.7% by weight of the composition, especially if a clay is also incorporated.

An advantageous composition according to the invention may also comprise polymers or resins suitable for serving as binder (as mentioned beforehand) as organic additives. According to the invention, polyvinyl alcohol may notably be incorporated in the compositions, as indicated in document GB 2048235 A, or else polyvinyl acetate, or a mixture of these two polymers, or styrene/acrylic or ethylene/vinyl acetate copolymers, etc.

A composition according to the present invention may also comprise secondary ingredients, such as one or more antifoaming agents, or biocidal antibacterial or biocidal compounds, one or more water-retention agents, or one or more setting retarders (notably organic acids), or one or more coloured pigments.

As is well known, the compositions according to the invention may therefore be supplied in the form of dry powders for subsequent mixing with water at their place of application to give a viscous paste in the form of a coating.

Alternatively, they may be mixed with water by the manufacturer or the retailer—who can then use mixing machines—, to form a coating, sold in sealed containers.

A typical water content by weight is in the range from 28 to 40 wt % in the coating, which corresponds approximately to weight ratios of water to powder (dry extract) from 0.4 to 0.6.

The present invention also relates to the preparation of a composition ("fireproofed", or displaying improved fire resistance, notably in the sense that it has better high-temperature dimensional stability), comprising a step consisting of preparing a basic mix (at least) of calcium carbonate and nanometric boehmite and/or nanometric aluminium trihydroxide and/or of adding nanometric boehmite and/or nanometric aluminium trihydroxide to a composition based on calcium carbonate. It also relates to a method of manufacturing an element of construction, in particular a joint, using the composition according to the invention, and according to which a composition based on calcium carbonate comprising nanometric boehmite and/or nanometric aluminium trihydroxide is formed by mixing (according to the preceding step of preparation), and then said composition is formed, in particular by mixing/kneading with water and then application with a spatula, a coating knife, a float or a plasterer's trowel before drying. The invention also relates to a method for fireproofing a product, in particular a joint, formed from a composition based on calcium carbonate, in which nanometric boehmite and/or nanometric aluminium trihydroxide is added to said composition. In the aforementioned methods, addition of nanometric boehmite and/or nanometric aluminium trihydroxide, at a preferred level from 0.1 to 10 wt % of nanometric boehmite and/or of nanometric aluminium trihydroxide relative to the total dry mix forming the composition, may be done if necessary initially in the mix based on calcium carbonate or subsequently in the composition before final forming of the part of the product based on this composition.

The present invention also relates more generally to the use of nanometric boehmite and/or of nanometric aluminium trihydroxide (notably the use of the composition described above) for making products based on calcium carbonate, in particular joints based on calcium carbonate.

The present invention has demonstrated that addition of nanometric boehmite and/or nanometric aluminium trihydroxide to a composition based on calcium carbonate makes it possible to endow a product prepared from this composition with improved properties of fire resistance or stability, notably high-temperature dimensional stability (starting from 500° C. and in particular above 900° C., or even above 1000° C.).

Hereinafter, in the present invention, calcium carbonate notably means any calcium carbonate ($CaCO_3$) that may be of natural or synthetic origin; however, said calcium carbonate may include some impurities. Notably it is possible to use any calcium carbonate suitable for preparing conventional joints for plasterboard.

Composition based on calcium carbonate means any composition in which calcium carbonate is the predominant component by weight and notably any composition in which calcium carbonate represents more than 50 wt % of the dry mix.

Boehmite means an aluminium oxyhydroxide (also called alumina monohydrate, or else aluminium oxide (mono) hydroxide) of formula $AlO(OH)$ (in particular the gamma polymorphic form); aluminium trihydroxide means an aluminium (tri)hydroxide (also called alumina (tri)hydrate, or else aluminium oxide (tri)hydrate) of formula $Al(OH)_3$; nanometric component (boehmite and/or aluminium trihydroxide) means particles (of or forming said component) having a dimension or size below 950 nanometers, preferably below 750 nm, and notably below 500 nm, regardless of the shape of said particles.

Size of a particle is its equivalent diameter, i.e. the diameter of the sphere that would behave identically in granulometric analysis of the particles (or powder formed from said particles) forming (initially) the component in question, the granulometric distribution (set of particle sizes) being measured in particular by laser granulometry.

In the present invention, x wt % of nanometric component (boehmite and/or aluminium trihydroxide) signifies that the composition incorporates x wt % of particles of this component having a size below 950 nm (preferably below 750 nm, and notably below 500 nm); however, other particles of this component of larger size may be present in the composition (in other words, x % of nanometric component signifies x % of particles (of this component) that are nanometric/smaller than 950 nm). The size distributions are given using the D10, D50 or D90 percentiles, as applicable; Dy signifies that y % of the particles of the set of particles considered (or of the powder considered) have a size below Dy, and (100−y) % are larger.

As mentioned above, the size of the particles is measured by laser granulometry, for example using a granulometer marketed under the reference Partica LE-950 by the company Horiba, the powders being analysed in water, without using ultrasound.

Addition of nanometric boehmite is also particularly preferred relative to addition of aluminium trihydroxide in the present invention.

Preferably, the content of nanometric boehmite and/or of nanometric aluminium trihydroxide in the composition defined according to the invention is above 0.2%, notably above 0.3%, in particular above 0.4%, or above 0.5 wt %, or even above 0.7 wt %. Also preferably, the content of one or other of these compounds is below 9%, notably below 8 wt %.

Moreover, the size of the particles of nanometric boehmite and/or of nanometric aluminium trihydroxide is advantageously below 750 nanometers, or even below 500 nm, or even below 400 nm, notably below 300 nm, in particular below 200 nm. It is also advantageously above 20 nm, notably above 50 nm, in particular above 60 nm, or even above 80 nm.

In an especially preferred embodiment, the composition according to the invention comprises from 0.5 to 8 wt % of particles of boehmite, all the particles having a size below 750 nm, preferably a size between 20 and 500 nm.

Boehmite (or aluminium trihydroxide) may notably be added in the form of powder or in the form of colloidal suspension (dispersion in water or an acid notably) to the composition according to the invention or to a coating according to the invention.

Fibres (in the form of film, cloth, mat, etc.) or other reinforcements (cardboard sheet, etc.) may be envisaged in the products obtained from the composition according to the invention; the composition may be, for example, used as one or more layers for forming a joint, or for sticking a reinforcement or a part or jointing strip, and may also be used for making the finishing layer covering a reinforcement or a part or jointing strip, etc.

It has been observed that the products according to the invention are enriched with aluminium (observation by chemical analysis), have nodules, consisting in particular of aluminium and oxygen, intermingled with the calcium carbonate structure (observation by scanning electron microscope), and display a weight loss at around 220-320° C. for the products based on aluminium trihydroxide and at around 400-500° C. for the products based on boehmite (observation by thermogravimetric analysis (TGA)).

The present invention will be better understood and other details and advantageous features of the invention will become clear on reading the following examples, given for purposes of illustration, and non-limiting.

In order to test the performance of a composition according to the invention intended for forming joints in plasterboard, boards of 20 cm×25 cm were prepared with Placomix® Premium coating, a joint coating for plasterboard, marketed by the company Placoplatre and predominantly comprising calcium carbonate mixed notably with the amount of water necessary for preparation thereof.

A first board is prepared with the coating alone, as reference example. A second board according to the invention is prepared, further comprising a powder (powder B3 in the table) of particles of nanometric boehmite (all) having a size below 500 nm (and in particular a high proportion of particles smaller than 200 nm) in the proportions shown in Table 1.

Samples of parallelepipedal shape, with length equal to 200 mm and width equal to 150 mm, were taken (notably by cutting) and put in a furnace with a programmed rate of temperature rise according to standard ISO834, the dimensional variation of the width of the sample being recorded continuously. When the temperature reaches 500° C. and then 700° C., the shrinkage of the sample is measured, designated R500 and R700 respectively. After 60 minutes, the temperature reaching 945° C., the shrinkage of the sample R945 was measured. After 120 minutes, the temperature reaching 1049° C., the shrinkage of the sample R1049 was measured. The values of shrinkage (or dimensional variation), expressed in percentages, are given in Table 1.

TABLE 1

|  | Reference example | Example according to the invention |
|---|---|---|
| Placomix ® Premium | 100 parts by weight | 100 parts by weight |
| Powder B3 | — | 3 parts by weight |
| R500 | 0.4 | 0.1 |
| R700 | 0.5 | 0.1 |
| R945 | 3.7 | 2.0 |
| R1049 | 10.6 | 2.3 |

As shown in Table 1, addition of nanometric boehmite gives a significant improvement in high-temperature dimensional stability of the compositions based on calcium carbonate in a temperature range from 500° C. to more than 1000° C.

The composition according to the invention may notably be used advantageously for obtaining plasterboard joints for forming and/or covering partitions or ceilings of buildings, or alternatively as a joint or grouting coating, notably so as to produce a seal around pipes or cables which pass through floor tiles or walls, etc.

The invention claimed is:

1. A composition, comprising:
   from 50 to 99 wt % of the calcium carbonate;
   from 0.1 to 10 wt % of particles of boehmite having a particle size smaller than 950 nm; and
   at least one additive.

2. The composition according to claim 1, wherein the at least one additive is organic.

3. The composition according to claim 1, comprising:
   from 0.5 to 10% of the at least one additive, wherein the at least one additive is selected from the group consisting of an organic additive allowing chemical setting of said composition and a binder.

4. The composition according to claim 1, wherein the at least one additive is a mineral additive.

5. The composition according to claim 1, wherein the size of the particles of boehmite is below 750 nm.

6. The composition according to claim 5, wherein the size of the particles of boehmite is above 20 nanometers.

7. The composition according to claim 1, wherein the size of the particles of boehmite is below 500 nm.

8. The composition according to claim 7, wherein the size of the particles of boehmite is above 20 nanometers.

9. The composition according to claim 1, wherein the size of the particles of boehmite is below 400 nm.

10. The composition according to claim 1, wherein the size of the particles of boehmite is above 20 nanometers.

11. A coating composition, comprising:
    the composition according to claim 1, mixed with water.

12. The coating composition according to claim 11, comprising from 28 to 40 wt % of water.

13. A product, comprising the composition according to claim 1.

14. An element of construction, comprising:
    the composition according to claim 1.

15. An element of construction, comprising:
    the coating composition according to claim 11.

16. A method for fireproofing a product, comprising:
    adding particles of boehmite having a particle size smaller than 950 nm in an amount of 0.1 to 10 wt % to a composition comprising from 50 to 99 wt % of the calcium carbonate and at least one additive.

17. A method of manufacturing an element of construction, comprising:
    mixing a composition comprising
      from 50 to 99 wt % of the calcium carbonate,
      from 0.1 to 10 wt % of particles of boehmite having a particle size smaller than 950 nm; and
      at least one additive; and then
    forming the element of construction.

18. The method according to claim 17, wherein the element of construction is a joint.

19. An element of construction formed by the method according to claim 17.

20. A composition, comprising:
    from 50 to 99 wt % of calcium carbonate;
    from 3 to 8 wt % of particles of aluminium trihydroxide having a particle size smaller than 950 nm; and
    at least one selected from the group consisting of a mineral additive and an organic additive,
    wherein the mineral additive is at least one selected from the group consisting of a hydrated calcium sulphate, anhydrous calcium sulphate, dolomite, talc, mica, and a clay, and
    wherein the organic additive is at least one selected from the group consisting of a cellulose ether, a polyacrylamide, a polyvinyl alcohol, a polyvinyl acetate, a styrene/acrylic copolymer, and an ethylenevinyl acetate copolymer.

21. The composition of claim 20, comprising the mineral additive.

* * * * *